United States Patent [19]

Sanders

[11] Patent Number: 5,237,387
[45] Date of Patent: Aug. 17, 1993

[54] DUAL SERRODYNE RESONATOR FIBER OPTIC GYROSCOPE

[75] Inventor: Glen A. Sanders, Scottsdale, Ariz.

[73] Assignee: Honeywell Inc., Minneapolis, Minn.

[21] Appl. No.: 709,810

[22] Filed: May 31, 1991

Related U.S. Application Data

[63] Continuation of Ser. No. 404,039, Sep. 7, 1989, abandoned.

[51] Int. Cl.[5] ............................................. G01C 19/72
[52] U.S. Cl. ................................................... 356/350
[58] Field of Search ..................................... 356/350

[56] References Cited

U.S. PATENT DOCUMENTS

| | | |
|---|---|---|
| 4,135,822 | 1/1979 | Ezekiel . |
| 4,702,600 | 10/1987 | Handakh et al. ............ 356/350 |
| 4,735,506 | 4/1988 | Pavlath . |
| 4,759,629 | 7/1988 | Everest et al. . |
| 4,825,261 | 4/1989 | Schroeder . |

FOREIGN PATENT DOCUMENTS 3438184 4/1986 Fed. Rep. of Germany ...... 356/350

OTHER PUBLICATIONS

"Closed-Loop Fiber-Optic Gyroscope with a Sawtooth Phase-Modulated Feedback", Ebberg et al, OSA, Jun. 1985, pp. 300-302.
"Gated Phase—Modulation approach to Fiber-Optic Gyroscope with Lingarized Scale Factor", Kim et al, SA, Aug. 1985, pp. 375-377.
"Fiber Gyroscope with Phase-Modulated Single-Sideband Detection", Eberhard et al, OSA, Jan. 1984, pp. 22-24.
"Passive Fiber-Optic Ring Resonator for Rotation Sensing", Meyer et al, Optics Letters, Dec. 1983, pp. 644-646.
Lefevae et al, "III—Principle of the Digital Phase Ramp", 1984, pp. all.
In all Fibre Ring Resonator Gyroscope Using a Low Coherence Length Source, by F. Farahi, K. Kalli and D. A. Jackson.

*Primary Examiner*—Samuel A. Turner

[57] ABSTRACT

A dual serrodyne resonator fiber optic gyroscope utilizing two positive-going or two negative-going ramp signals having a frequency difference, to track resonance frequencies of laser light traveling in two directions in a fiber optic resonator. The difference in the servo-controlled variable ramp frequencies is proportional to rotation rate and is indicative of direction of rotation.

1 Claim, 3 Drawing Sheets

DUAL SERRODYNE RESONATOR FIBER OPTIC GYROSCOPE

This is a continuation of copending application Ser. No. 07/404,039, filed Sept. 7, 1989 now abandoned.

FIELD OF THE INVENTION

The invention pertains to gyroscopes and, in particular, to fiber optic gyroscopes. More particularly, the invention pertains to resonator fiber optic gyroscopes having serrodyne modulation.

BACKGROUND OF THE INVENTION

Fiber optic gyroscopes (FOGs) have been developed for navigation and guidance applications. FOGs are solid state devices have the potential advantages of long life, no moving parts, ruggedness, light weight, low cost potential, freedom from warm-up or run-up time, and low voltage power.

Several types of FOGs that have been developed are open loop and closed loop interferometric fiber optic gyroscopes (IFOGs), respectively, and resonant fiber optic gyroscopes (RFOGs). In basic terms, an open loop IFOG typically consists of a semiconductor source whose light is divided. About half of the light goes into one end of a fiber optic coil and propagates clockwise and the remaining light goes into the other end of the coil and propagates counterclockwise around the coil. Light from the clockwise and counterclockwise beams emerging from the ends of the coil is combined and its intensity is measured by a photodetector. When the device is not rotating, the emerging light beams combine in phase for maximum intensity to produce a maximum output signal from the photodetector. Upon rotation of the IFOG, there is a resulting phase difference between the two emerging beams which creates an interference that reduces the intensity of the combined beam and thus the photodetector output signal. Such design has several drawbacks in that it has the least sensitivity near the at-rest condition and that the photodetector output does not indicate the direction of rotation. These characteristics can be improved if the phase between the clockwise and counterclockwise beams is shifted (i.e., biased) by 90 degrees. Typically, bias is introduced by an electro-optical phase modulator which varies the phase shift in a sinusoidal fashion. By demodulating the photodetector output signal at the same frequency, the demodulated output signal will have the desired maximum sensitivity near the at-rest condition. Also, the demodulated signal has opposite polarity for clockwise and counterclockwise inertial rotation, thus explicitly indicating the direction of rotation. Bias stability (i.e., the FOG's random drift rate in degrees per hour) is reasonably favorable. A major shortcoming of the open loop IFOG is that its output signal is only strictly linearly proportional to its rotation rate near zero rotation rates. The output becomes increasingly nonlinear at higher rates. Secondly, the output at higher rates becomes increasingly sensitive to the gains of various electronic amplifiers which are not operating near null in the open-loop gyro configurations. To overcome such nonlinearity and dependencies on such absolute gain stabilities, a closed loop FOG was developed. With the closed loop version, rotation of the IFOG causes a phase shift between the clockwise and the counterclockwise beams, thereby generating a signal which is applied to a transducer to cancel the shift. Thus, the IFOG operates near its most sensitive null position. Absolute accuracies in the electronics are no longer critical.

In one particular closed loop IFOG configuration, referred to as the "serrodyne" technique, the phase-shift transducer located at one end of the coil is excited with a sawtooth voltage, thereby imparting on the light a phase ramp with periodic resets. The ramp height is adjusted to be $2\pi$ radians and the reset or flyback time is made to be very small compared to the period of the sawtooth; the light wave is effectively frequency shifted by frequency $\Delta f$ of the sawtooth wave. Since both clockwise and counterclockwise waves traverse the phase modulator, both are frequency shifted before being interfered at the photodetector. However, one light wave experiences the frequency shift before traversing the coil and one light wave is frequency shifted after traversing the coil. Because two light waves thus traverse the coil at different frequencies there is a net phase difference between them which is used to null out the phase shift due to rotation. The required sawtooth frequency or effective frequency shift $\Delta f$ necessary to produce a phase shift to counterbalance the phase shift due to rotation is a digital measure and linear measure of the rotation rate. This design increases the accuracy of the FOG since the output is a frequency which can be measured more accurately than an analog voltage in an open-loop case. The closed loop approach also improves the IFOG's dynamic range.

Another competing FOG technology is the RFOG which more closely resembles a ring laser gyroscope than an IFOG. The RFOG uses a short coil relative to the other FOG technologies, thereby reducing size, effects of thermal transient gradients, and cost. Also, the RFOG offers the greatest potential for enhanced accuracy. An IFOG uses a diode light source which is semi-coherent (i.e., broadband) whereas the RFOG utilizes a coherent (i.e., narrowband) light source. The RFOG's operation is based on the use of a fiber-optical cavity made from a few turns of optical fiber which is precisely tuned so that only certain discrete frequencies will travel through the cavity. The frequencies that can travel through the optical cavity in the clockwise and counterclockwise directions are known as the clockwise and counterclockwise resonant frequencies of the cavity. The clockwise and counterclockwise resonance frequencies are the same in the absence of rotation, but split in the presence of rotation. To measure this frequency splitting, a closed loop design is incorporated. Since the RFOG measures rotation-induced resonant frequency splitting in a fiber resonator, a frequency shifter is required to track the clockwise and the counterclockwise frequencies. In practice the only suitable frequency shifting technique using a "guided-wave" implementation is to use a phase modulator in conjunction with the serrodyne modulation technique. Serrodyne modulation has commonly been associated with baseband frequency shifting. However, baseband frequency shifting in the related art presents several problems when implemented in RFOGs. Namely, the use of both positive and negative going ramp signals are required to handle clockwise and counterclockwise rotation rates. Further, long ramp signals are required to null low rotation rates and the ramp signals needed to be nearly perfect in slope because imperfect ramps generate unwanted sideband frequency components which result in gyroscope errors.

SUMMARY OF THE INVENTION

The present invention eliminates the problems of baseband frequency shifting thereby effecting a practical and successful implementation of the RFOG. The invention is a dual serrodyne that utilizes two positively going ramps (or two negatively going ramps) to track the resonance frequencies of a fiber resonator of the gyroscope and therefore determine its rotation rate. Each of the serrodyne frequencies is no longer at the baseband frequency but at a appropriate nominal frequency. The difference in the two ramp frequencies, when properly servo-controlled, is proportional to rotation. This invention permits the use of relatively fast ramp signals and eliminates the need for any one modulator to be driven from positive to negative going ramp signals (or vice versa) as the rotation rate of the gyroscope changes direction.

DESCRIPTION OF THE PREFERRED EMBODIMENT

Figure 1:
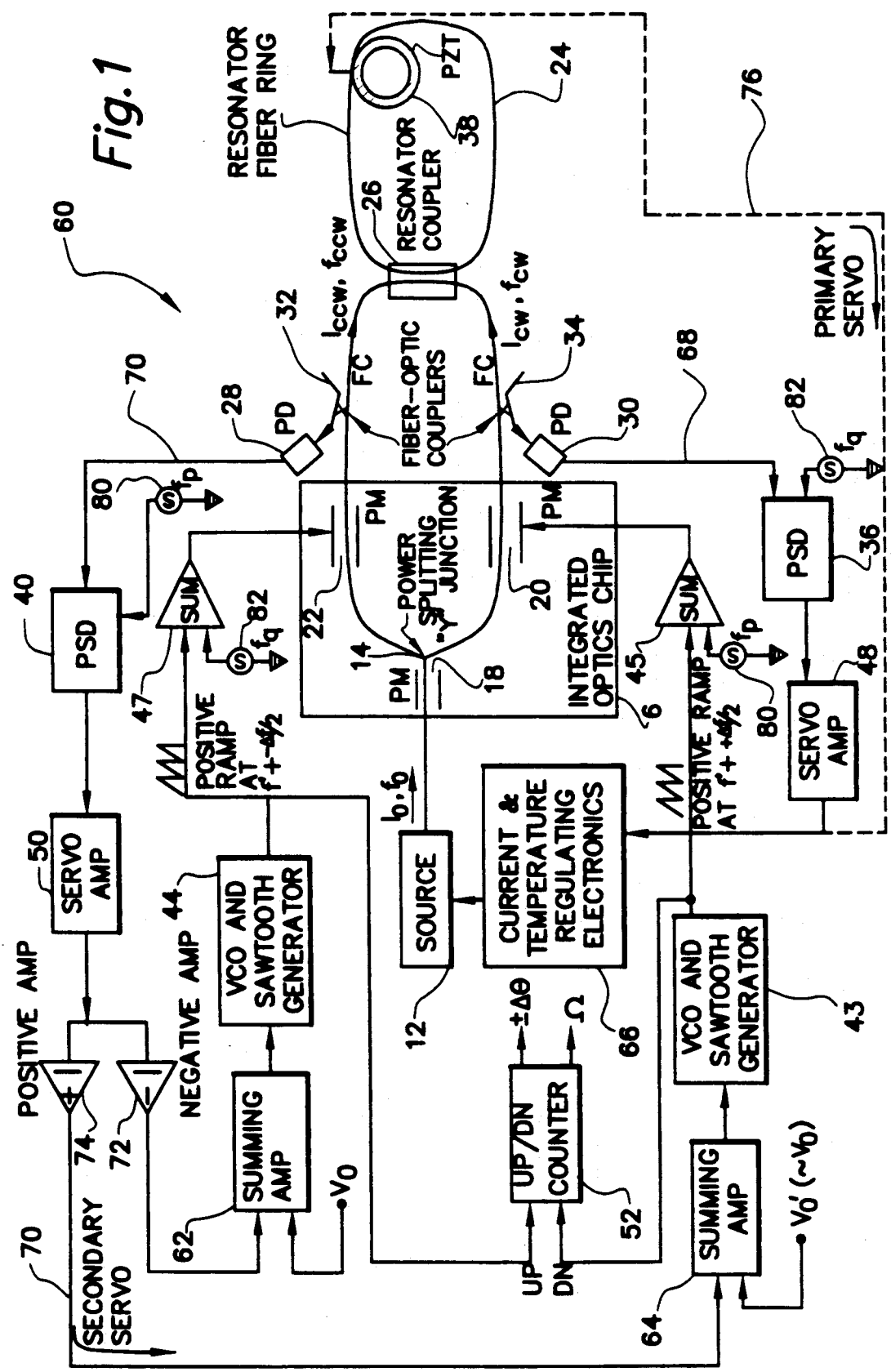
FIG. 1 is a diagram showing an RFOG using dual serrodyne modulation by varying two ramp signals.

The basic operation of the RFOG 60 with dual serrodyne modulation is illustrated in FIG. 1. Coherent and monochromatic light from tunable single frequency laser source 12 at frequency $f_o$ and intensity $I_o$ is split into two beams by power splitter 14 of integrated optical device 16. Laser source 12 may be tuned so that the frequency of the light entering ring 24 in the counterclockwise and clockwise directions via resonator coupler 26 is at the center of resonance of ring 24 which is a fiber optic resonator, typically consisting between 1 and 100 meters of fiber. The input light circulates in fiber optic ring 24 in clockwise (cw) and counterclockwise (ccw) directions.

Figure 3:
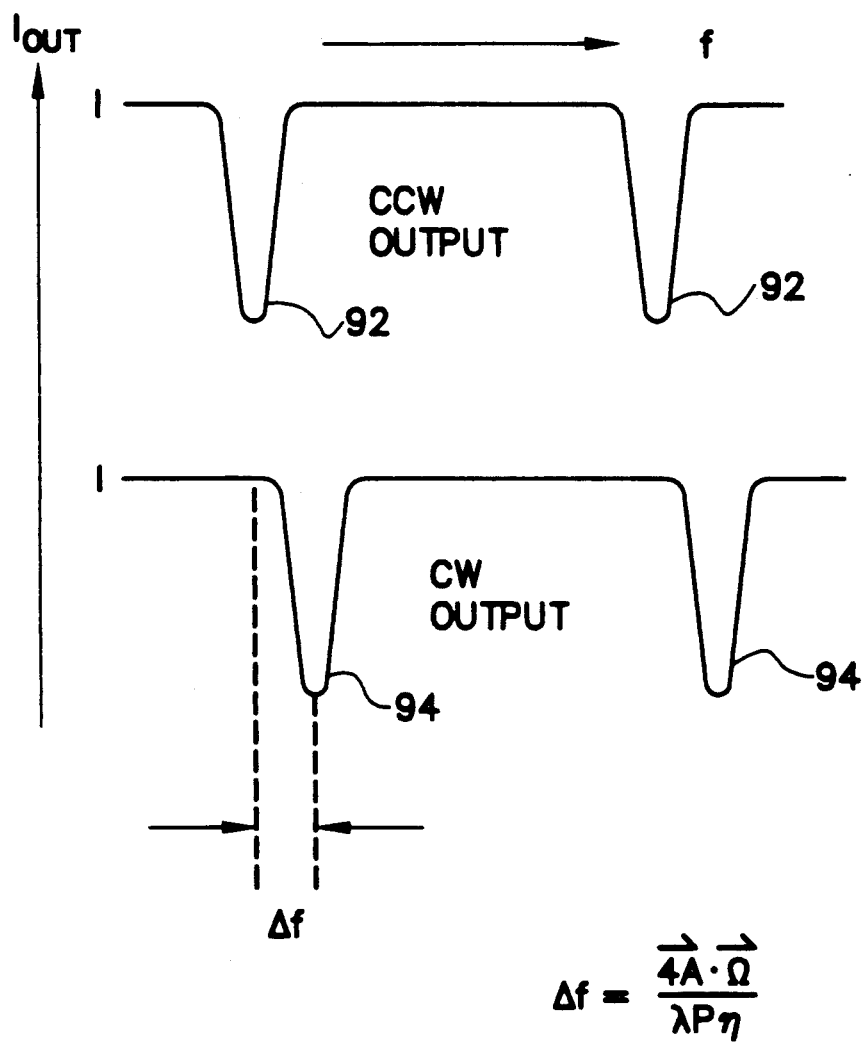
FIG. 3 illustrates the resonant dips of intensities of light traveling in different directions in a fiber optic resonator ring of the RFOG.

The cw and ccw light of resonator ring 24 comes out through coupler 26 and the light is sensed by photodetectors (PDs) 28 and 30 (having preamplifiers) via fiber optic couplers (FCs) 32 and 34, respectively. The output of photodetectors 28 and 30 as a function of the input light frequencies is sometimes described in the art as a resonance dip (92 or 94 as shown in FIG. 3) when the input light is tuned near resonance. The resonance dip may be substituted with a resonance peak or other signal variation indicating resonance. The average frequency $f_{ccw}$ of the ccw input wave is automatically adjusted to the ccw resonance frequency of resonator 24 based on the sensing by phase sensitive demodulator (PSD) 36 the presence of a signal at $f_q$ on photodetector 30, and by using the output of phase sensitive detector 36 as the basis for an error signal to adjust the ccw input frequency (where $f_{ccw}$ is equal to $f_o+f'$ in a no rotation case) via electronics 66 that varies source 12 so that $f_{ccw}$ matches the ccw resonant ring 24 frequency. In another embodiment of RFOG 60, primary servo loop 68, through servo amplifier 48, may instead maintain the ccw resonance condition by controlling the cavity path length via connection 76 and piezo length adjuster (PZT) 38 in resonator ring 24.

In servo loop 70, a cw departure from resonance is sensed by phase sensitive detector 40 which senses a signal at $f_p$ corresponding to a shift from the center of the resonance dip seen on the output of photodetector 28. Servo loop 70 then imparts a frequency difference $\Delta f$ between the cw and ccw frequencies to null out rotation. Servo 70 provides nulling by applying positive frequency shifts to both cw and ccw inputs which are nominally large and then the difference $\Delta$between the inputs is tuned to null rotation. Both frequency shifts are obtained by applying to phase modulators (PMs) 20 and 22 nominal sawtooth voltage waveforms from generators 43 and 44 via summing amplifiers 45 and 47, respectively, which both have a frequency f' in absence of rotation. Generators 43 and 44 (which generate sawtooth waveform output of frequencies determined by voltage level inputs having a frequency based from voltage controlled oscillators (VCOs)). These waveforms at f' are determined by constant but adjustable voltages $V_o$ and $V_o'$, to summing amplifiers 62 and 64. The varying frequency increases or decreases are determined by additional but varying voltages from inverting amplifier 72 and noninverting amplifier 74 to summing amplifiers 62 and 64, respectively.

Figure 2:
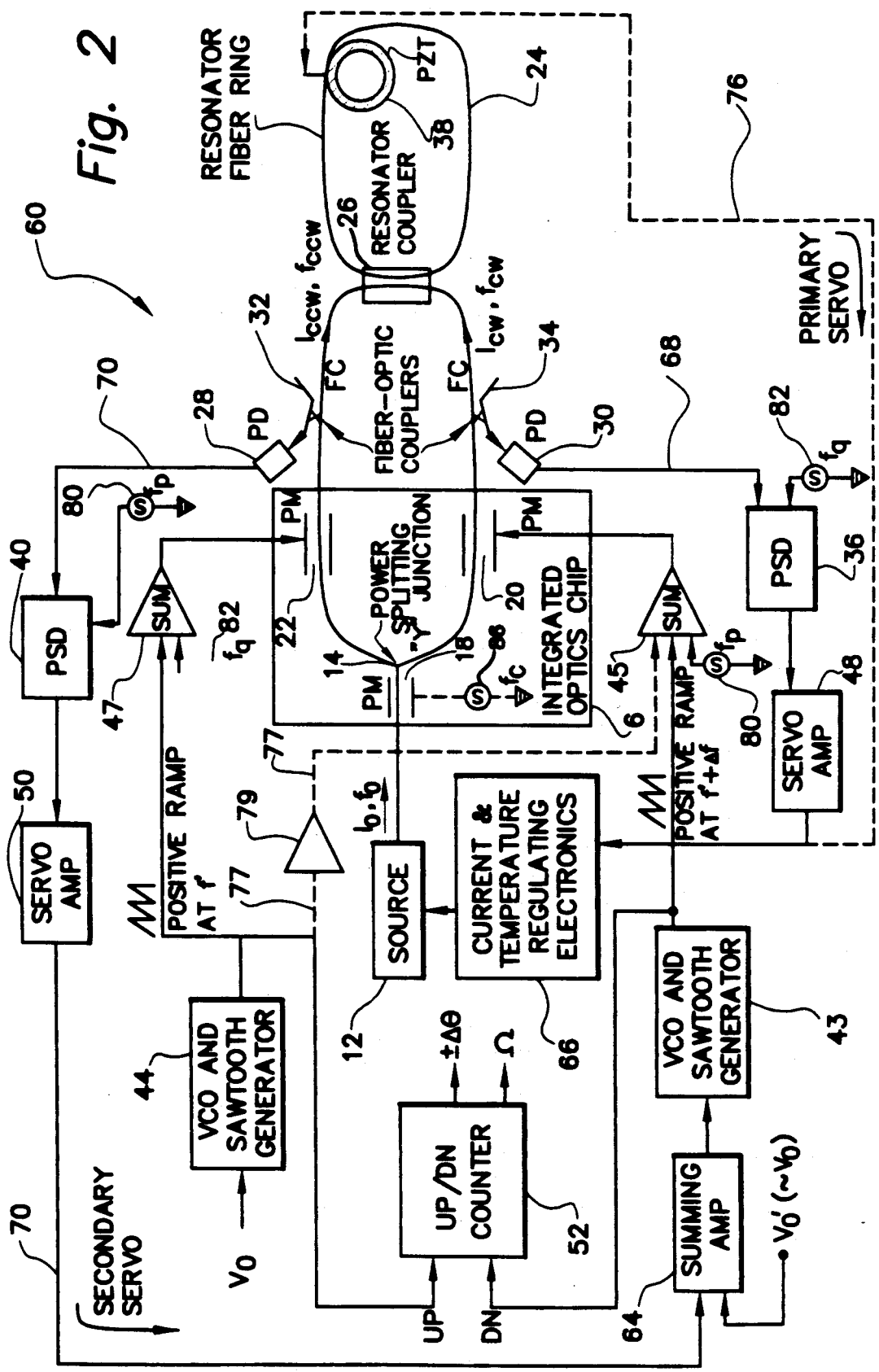
FIG. 2 is a diagram showing the RFOG using dual serrodyne modulation by varying one ramp signal.

Each sawtooth waveform, introduced through modulators 20 and 22, respectively, generates a phase ramp on the light that provides an increasing magnitude representing a variation from 0 to $2\pi$, with a fast flyback time, otherwise known as a serrodyne waveform, to effectively implement a frequency-shift difference between input light beams of $\Delta f$. In the presence of rotation, $$\Delta f = f_{cw} - f_{ccw} = (4A/\lambda Pn)\Omega$$

where $\Omega$ is the rotation rate, A is the area within the loop 24 perpendicular to its axis, P is the perimeter of loop 24, n is the index of refraction of the fiber and $\lambda$ is the wavelength of the light. In FIGS. 1 and 2, $\pm\Delta\theta$ indicates the direction and amount of rotation.

Relatively high frequency rates for the sawtooth signals may be used. For instance, f' may be 100 kilohertz and $\Delta f$ may be as large as 50 kilohertz. When the gyroscope is undergoing rotation, one sawtooth ramp is driven faster (i.e., at a faster rate) than f' by the amount of $\Delta f/2$ and the other ramp is driven slower by $-\Delta f/2$, wherein the total difference of sawtooth frequency from f' is $\Delta f$. The $f_{cw}$ of the light moving cw in ring 24 is adjusted by $+\Delta f/2$ and the $f_{ccw}$ of the light moving ccw in ring 24 is adjusted by $-\Delta f/2$, for aligning the input light frequencies to the centers of the resonance dips 92 and 94 of ring 24.

By counting the number of zero crossings of the two ramps with up/down counter 52, the angular displacement rate as well as direction of rotation can be determined. The output of up/down counter 52 may be measured in one-second intervals to obtain $\Delta f$.

Each light beam is sinusoidally phase modulated with fixed frequencies $f_p$ and $f_q$, from generators 47 and 49 and via phase modulators 20 and 22, respectively, prior to entering fiber ring resonator 24 via resonator coupler 26. If $f_p = f_q$, then the fixed frequency signals of $f_p$ or $f_q$ may be introduced via phase modulator 18 (which may be an NLiNbO$_3$ integrated optical phase modulator). If more than negligible backscatter exists in the system's light paths, then $f_p \neq f_q$. Frequencies $f_p$ and $f_q$ from generators 80 and 82 provide signatures on the light via summing amplifiers 47 and 45 and phase modulators 22 and 20. These signatures are detected by the photodetectors 28 and 30, and phase sensitive detectors 40 and 36, respectively, which receive the relevant signals for identification purposes from generators 80 and 82. Frequencies selected for $f_p$ and $f_q$ may be from 20 kilohertz to 1 megahertz.

Frequency $f_p$ is added on top of the ramp signal through summing amplifier 45. These modulations at $f_p$ and $f_q$ produce discriminants to enable sensing the directions of the departures of the average input light frequencies $f_{cw}$ and $f_{ccw}$ from the resonance frequencies of resonator 24. In other words, frequencies $f_p$ and $f_q$ provide, in essence, a dither so that phase sensitive detectors 40 and 36, respectively, can indicate the direction of the needed shift of the frequency of light to the resonance centers of ring 24.

The dual serrodyne approach of FIG. 1 may be simplified as shown in FIG. 2. FIG. 2 has become the best mode contemplated by the inventor for carrying out his invention at the present date. FIG. 2 involves applying merely a fixed (non-servo-controlled) frequency shift $f'$ to the ccw input light beam (by applying a fixed-frequency sawtooth at a frequency $f'$ to phase modulator 22) and then to servo-control only the positive-going sawtooth ramp that is applied to phase modulator 20. The output of servo amplifier 50 is directly connected to summing amplifier 64 and thereby controls generator 43 and the frequency of the ramp signal eventually applied to modulator 20. In the presence of rotation, the cw input would be tuned to $f_o + f' + \Delta f$. In absence of rotation, the cw input frequency would automatically be tuned to $f_o + f'$.

An alternative connection for generator 44 would be to have its output disconnected from summer 47 and connected to summer 45 with generator 43, via buffer 79 and connecting line 77. Also, if $f_p = f_q$, then $f_c$, which is equal to $f_p$ and $f_q$, may be entered from generator 86 to phase modulator 18 in lieu of generators 80 and 82.

The foregoing detailed description of the dual serrodyne resonator fiber optic gyroscope is intended to be exemplary rather than limiting, and the description sets forth the best mode contemplated by the inventor of carrying out his invention. Numerous modifications and variations to the present invention will be obvious to those skilled in the art without deviating from the spirit of the invention. Accordingly, all such variations and modifications to present invention are deemed to fall within the scope of the present invention.

We claim:

1. A fiber optic gyroscope, comprising:
    a light source, a light splitter in operable relationship to said source for providing a pair of outputs, and an optical fiber defining two optic paths for light from said splitter;
    a fiber optic ring resonator and a coupler for coupling said resonator to said two optic paths in said fiber;
    photodetector means for providing photodetector signals detected from each of said two paths;
    phase sensitive detector means for processing said photodetector signals to provide processed signals for each path;
    servo amplifier means for transmitting said processed signals and controlling the frequency of said light source, said servo amplifier means including a first servo amplifier connected to said light source and a second servo amplifier connected to said phase sensitive detector means and including first and second outputs;
    voltage controlled oscillator means for generating first and second saw tooth ramp signals of the same sign for each path, the first saw tooth ramp signal being faster than the second saw tooth ramp signal by $\Delta f/2$;
    integrated optic phase modulator means coupled to said two paths for introducing said saw tooth ramp signals into said paths, said integrated optic phase including separate saw tooth ramp signal generating means, each of which being connected to one of said first and second outputs of said second servo amplifier means; and
    input responsive means for receiving said processed signals from each path.

* * * * *

UNITED STATES PATENT AND TRADEMARK OFFICE
CERTIFICATE OF CORRECTION

PATENT NO. : 5,237,387
DATED : Aug. 17, 1993
INVENTOR(S) : GLEN A. SANDERS

It is certified that error appears in the above-indentified patent and that said Letters Patent is hereby corrected as shown below:

Column 6, line 32, cancel "$\Delta f/2$" and substitute --$\Delta f$--.

Signed and Sealed this

Third Day of May, 1994

Attest:

BRUCE LEHMAN

*Attesting Officer*                *Commissioner of Patents and Trademarks*